US010936175B2

(12) United States Patent
Chou et al.

(10) Patent No.: US 10,936,175 B2
(45) Date of Patent: Mar. 2, 2021

(54) SYSTEMS AND METHODS FOR IMPLEMENTING A PIN MECHANISM IN A VIRTUAL COSMETIC APPLICATION

(71) Applicant: Perfect Corp., New Taipei (TW)

(72) Inventors: Cheng Chou, New Taipei (TW); Tsung-Peng Yen, Kaohsiung (TW); Chieh-Chung Wu, New Taipei (TW)

(73) Assignee: PERFECT CORP., New Taipei (TW)

( * ) Notice: Subject to any disclaimer, the term of this patent is extended or adjusted under 35 U.S.C. 154(b) by 59 days.

(21) Appl. No.: 16/007,474

(22) Filed: Jun. 13, 2018

(65) Prior Publication Data

US 2019/0243531 A1     Aug. 8, 2019

Related U.S. Application Data

(60) Provisional application No. 62/625,405, filed on Feb. 2, 2018.

(51) Int. Cl.
*G06F 3/0482* (2013.01)
*G06F 3/0484* (2013.01)
*G06Q 30/02* (2012.01)

(52) U.S. Cl.
CPC ........ *G06F 3/04845* (2013.01); *G06F 3/0482* (2013.01); *G06Q 30/02* (2013.01); *G06F 2203/04803* (2013.01)

(58) Field of Classification Search
CPC ............... G06F 3/04845; G06F 3/0482; G06F 2203/04803; G06Q 30/02
See application file for complete search history.

(56) References Cited

U.S. PATENT DOCUMENTS 7,079,158 B2   7/2006  Lambertsen
8,910,082 B2  12/2014  Aarabi
(Continued)

FOREIGN PATENT DOCUMENTS

| CN | 105354869 A | 2/2016 |
|---|---|---|
| CN | 106204691 A | 12/2016 |
| EP | 1196893 B1 | 4/2002 |

OTHER PUBLICATIONS

Jisoo Park et al. "An Automatic Virtual Makeup Scheme Based on Personal Color Analysis" Ubiquitous Information Management and Communication, ACM, 2 Penn Plaza, Suite 701 New York NY 10121-0701 USA, Jan. 5, 2018 (Jan. 5, 2018), pp. 1-7, XP058407756.

(Continued)

*Primary Examiner* — Jennifer N To
*Assistant Examiner* — Amy P Hoang
(74) *Attorney, Agent, or Firm* — McClure, Qualey & Rodack, LLP

(57) ABSTRACT

A computing device obtains multimedia content relating to a user of the computing device and generates a user interface. In a first mode of operation, the user interface displays a plurality of graphical thumbnails each depicting a cosmetic result, each graphical thumbnail corresponding to a cosmetic template, each of the plurality of cosmetic templates comprising a listing of cosmetic effects utilized for achieving each corresponding cosmetic result. A selection is obtained from the user of one or more graphical thumbnails to select one or more cosmetic templates. Responsive to operating in the second mode of operation, a corresponding listing of cosmetic effects is displayed for each of the one or more selected cosmetic templates and obtaining selection of one or more of the displayed cosmetic effects. Responsive to exiting the second mode of operation, the selected one or more cosmetic effects from the one or more selected cos- (Continued)

metic templates is applied to each of the plurality of cosmetic templates to generate updated cosmetic templates.

19 Claims, 13 Drawing Sheets

(56) References Cited

U.S. PATENT DOCUMENTS

| | | |
|---|---|---|
| 8,977,389 B2 | 3/2015 | Witchell et al. |
| 9,058,765 B1 | 6/2015 | Mallick et al. |
| 9,224,248 B2 | 12/2015 | Ye et al. |
| 9,449,412 B1 | 9/2016 | Rogers et al. |
| 9,460,462 B1 | 10/2016 | Walker et al. |
| 9,665,906 B2 | 5/2017 | Adeyoola et al. |
| 9,681,736 B2 | 6/2017 | Yamanashi et al. |
| 2002/0071604 A1 | 6/2002 | Orpaz et al. |
| 2003/0065578 A1* | 4/2003 | Peyrelevade ........ A45D 44/005 705/14.54 |
| 2014/0280890 A1 | 9/2014 | Yi et al. |
| 2016/0162923 A1* | 6/2016 | Meier ................ G06Q 30/0214 705/14.16 |
| 2017/0255478 A1 | 9/2017 | Chou et al. |
| 2017/0256084 A1* | 9/2017 | Iglehart .............. G06K 9/00221 |
| 2017/0358116 A1* | 12/2017 | Cheng ................ G06K 9/00228 |
| 2018/0075524 A1* | 3/2018 | Sartori Odizzio ......................... G06Q 30/0643 |

OTHER PUBLICATIONS

Presley West, "Sephora's AR App Update Lets You Try Virtual Makeup on at Home—VRScout", Mar. 22, 2017 (Mar. 22, 2017), XP055568002.

European search report issued in corresponding European patent application No. 18202314.3 dated Mar. 26, 2019.

* cited by examiner

SYSTEMS AND METHODS FOR IMPLEMENTING A PIN MECHANISM IN A VIRTUAL COSMETIC APPLICATION

CROSS-REFERENCE TO RELATED APPLICATION

This application claims priority to, and the benefit of, U.S. Provisional Patent Application entitled, "Pin effect mechanism," having Ser. No. 62/625,405, filed on Feb. 2, 2018, which is incorporated by reference in its entirety.

TECHNICAL FIELD

The present disclosure generally relates to media editing and more particularly, to systems and methods for implementing a pin mechanism for performing virtual application of cosmetic effects.

BACKGROUND

With the proliferation of smartphones, tablets, and other display devices, people have the ability to view and edit digital content virtually any time where application programs have become popular on smartphones and other portable display devices for editing media content. Although individuals increasingly rely on their portable devices for their computing needs, however, one drawback is the relatively small size of the displays on such devices when compared to desktop computer displays or televisions as only a limited amount of information is viewable on such displays. Therefore, it is desirable to provide an improved platform for allowing individuals to efficiently edit media content.

SUMMARY

In accordance with one embodiment, a computing device obtains multimedia content relating to a user of the computing device and generates a user interface, wherein in a first mode of operation, the user interface displays a plurality of graphical thumbnails each depicting a cosmetic result, each graphical thumbnail corresponding to a cosmetic template, each of the plurality of cosmetic templates comprising a listing of cosmetic effects utilized for achieving each corresponding cosmetic result. The computing device obtains a selection from the user of one or more graphical thumbnails to select one or more cosmetic templates and obtains a user input to invoke a second mode of operation. Responsive to operating in the second mode of operation, the computing device displays a corresponding listing of cosmetic effects for each of the one or more selected cosmetic templates and obtaining selection of one or more of the displayed cosmetic effects. The computing device obtains a second user input to exit the second mode of operation. Responsive to exiting the second mode of operation, the computing device applies the selected one or more cosmetic effects from the one or more selected cosmetic templates to each of the plurality of cosmetic templates to generate updated cosmetic templates.

Another embodiment is a system that comprises a memory storing instructions and a processor coupled to the memory. The processor is configured by the instructions to obtain multimedia content relating to a user of the system and generates a user interface, wherein in a first mode of operation, the user interface displays a plurality of graphical thumbnails each depicting a cosmetic result, each graphical thumbnail corresponding to a cosmetic template, each of the plurality of cosmetic templates comprising a listing of cosmetic effects utilized for achieving each corresponding cosmetic result. The processor obtains a selection from the user of one or more graphical thumbnails to select one or more cosmetic templates and obtains a user input to invoke a second mode of operation. Responsive to operating in the second mode of operation, the processor displays a corresponding listing of cosmetic effects for each of the one or more selected cosmetic templates and obtaining selection of one or more of the displayed cosmetic effects. The processor obtains a second user input to exit the second mode of operation. Responsive to exiting the second mode of operation, the processor applies the selected one or more cosmetic effects from the one or more selected cosmetic templates to each of the plurality of cosmetic templates to generate updated cosmetic templates.

Another embodiment is a non-transitory computer-readable storage medium storing instructions to be implemented by a computing device having a processor, wherein the instructions, when executed by the processor, cause the computing device to obtain multimedia content relating to a user of the computing device and generates a user interface, wherein in a first mode of operation, the user interface displays a plurality of graphical thumbnails each depicting a cosmetic result, each graphical thumbnail corresponding to a cosmetic template, each of the plurality of cosmetic templates comprising a listing of cosmetic effects utilized for achieving each corresponding cosmetic result. The processor obtains a selection from the user of one or more graphical thumbnails to select one or more cosmetic templates and obtains a user input to invoke a second mode of operation. Responsive to operating in the second mode of operation, the processor displays a corresponding listing of cosmetic effects for each of the one or more selected cosmetic templates and obtaining selection of one or more of the displayed cosmetic effects. The processor obtains a second user input to exit the second mode of operation. Responsive to exiting the second mode of operation, the processor applies the selected one or more cosmetic effects from the one or more selected cosmetic templates to each of the plurality of cosmetic templates to generate updated cosmetic templates.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Various embodiments are disclosed for providing an improved media editing platform that allows individuals to efficiently access and customize cosmetic templates that specify the application of one or more cosmetic products to achieve a desired cosmetic result. Specifically, embodiments are directed to implementing a pin mechanism in a virtual cosmetic application platform. In some embodiments, a system for performing virtual application of cosmetic products is provided where multimedia content relating to a user is obtained by a computing device. In the context of this disclosure, the multimedia content relating to the user can include a self-portrait video of the user and/or a self-portrait image of the user. A user interface is generated, whereby in a first mode of operation, the user interface displays graphical thumbnails representations that depict various cosmetic results achieved through the application of different cosmetic products. The user selects a desired cosmetic result and invokes a second mode of operation, whereby the user then selects one or more cosmetic effects to further customize the selected cosmetic result. This may comprise, for example, removing (or deselecting) certain cosmetic effects (e.g., removal of lipstick) while retaining desired cosmetic effects or simply selecting desired cosmetic effects (e.g., addition of eyeliner). Virtual application of the selected cosmetic effects is performed on the facial region depicted the multimedia content relating to the user. When the user exits the second mode of operation, the selected cosmetic effects are then automatically propagated to all the cosmetic templates, as described in more detail below.

Figure 1:
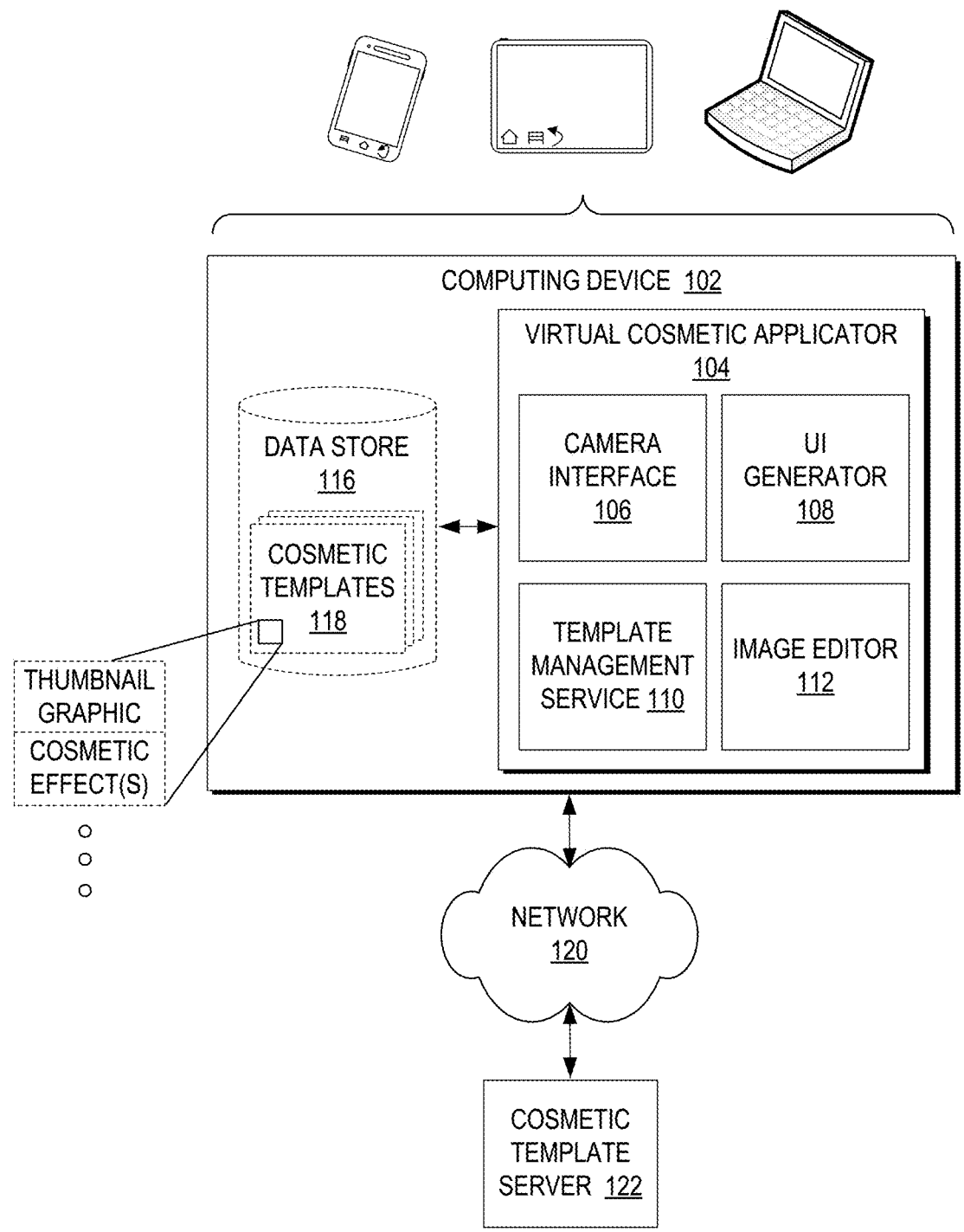
FIG. 1 is a block diagram of a computing device for implementing a pin mechanism in a virtual cosmetic application platform in accordance with various embodiments of the present disclosure.

A description of a system for implementing a pin mechanism in a virtual cosmetic application platform is now described followed by a discussion of the operation of the components within the system. FIG. 1 is a block diagram of a computing device 102 in which the techniques for implementing a pin mechanism in a virtual cosmetic application platform disclosed herein may be implemented. The computing device 102 may be embodied as a computing device such as, but not limited to, a smartphone, a tablet computing device, a laptop, and so on.

A virtual cosmetic applicator 104 executes on a processor of the computing device 102 and includes a camera interface 106, a user interface (UI) generator 108, a template management service 110, and an image editor 112. The camera interface 106 is configured to obtain multimedia content relating to a user of the computing device 102, where the multimedia content may be captured by a front facing camera integrated into the computing device 102. Alternatively, the camera interface 106 may obtain the multimedia content from an external digital recording device coupled to the computing device 102 or from another computing device with digital recording capabilities.

As one of ordinary skill will appreciate, the multimedia content may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. Alternatively, the multimedia content may be derived from a still image of a video encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The UI generator 108 is configured to render user interfaces to facilitate the virtual application of cosmetic products. In a first mode of operation, the user interface displays a series of graphical thumbnail representations that each depict a different cosmetic result achieved by the application of one or more cosmetic effects corresponding to cosmetic products. The various cosmetic effects utilized to achieve the cosmetic result are defined by a cosmetic template 118. Each cosmetic template 118 includes a corresponding thumbnail graphic that depicts a representation of a cosmetic effect, and each cosmetic template 118 also includes a listing of one or more cosmetic effects utilized to achieve the cosmetic result corresponding to the cosmetic template 118.

In a second mode of operation, the UI generator 108 renders a user interface that displays a listing of cosmetic effects for a selected cosmetic template 118. The user of the computing device 102 utilizes the user interface to select one or more of the displayed cosmetic effects. As described in more detail below, the user may switch between the first and second modes of operation by using a toggle control on the user interface.

The template management service 110 is configured to apply the cosmetic effects selected by the user to each of the cosmetic templates 118 to generate updated cosmetic templates 118. The template management service 110 then stores the updated cosmetic templates 118 into a data store 116. The image editor 112 is configured to perform virtual application of cosmetic effects onto a facial region depicted in the multimedia content relating to the user based on the updated cosmetic templates 118.

The computing device 102 may be coupled to a network 120 such as, for example, the Internet, intranets, extranets, wide area networks (WANs), local area networks (LANs), wired networks, wireless networks, or other suitable networks, etc., or any combination of two or more such networks. Through the network 120, the computing device 102 may be communicatively coupled to other computing devices such as the cosmetic template server device 122 for purposes of retrieving new and/or updated cosmetic templates.

Figure 2:
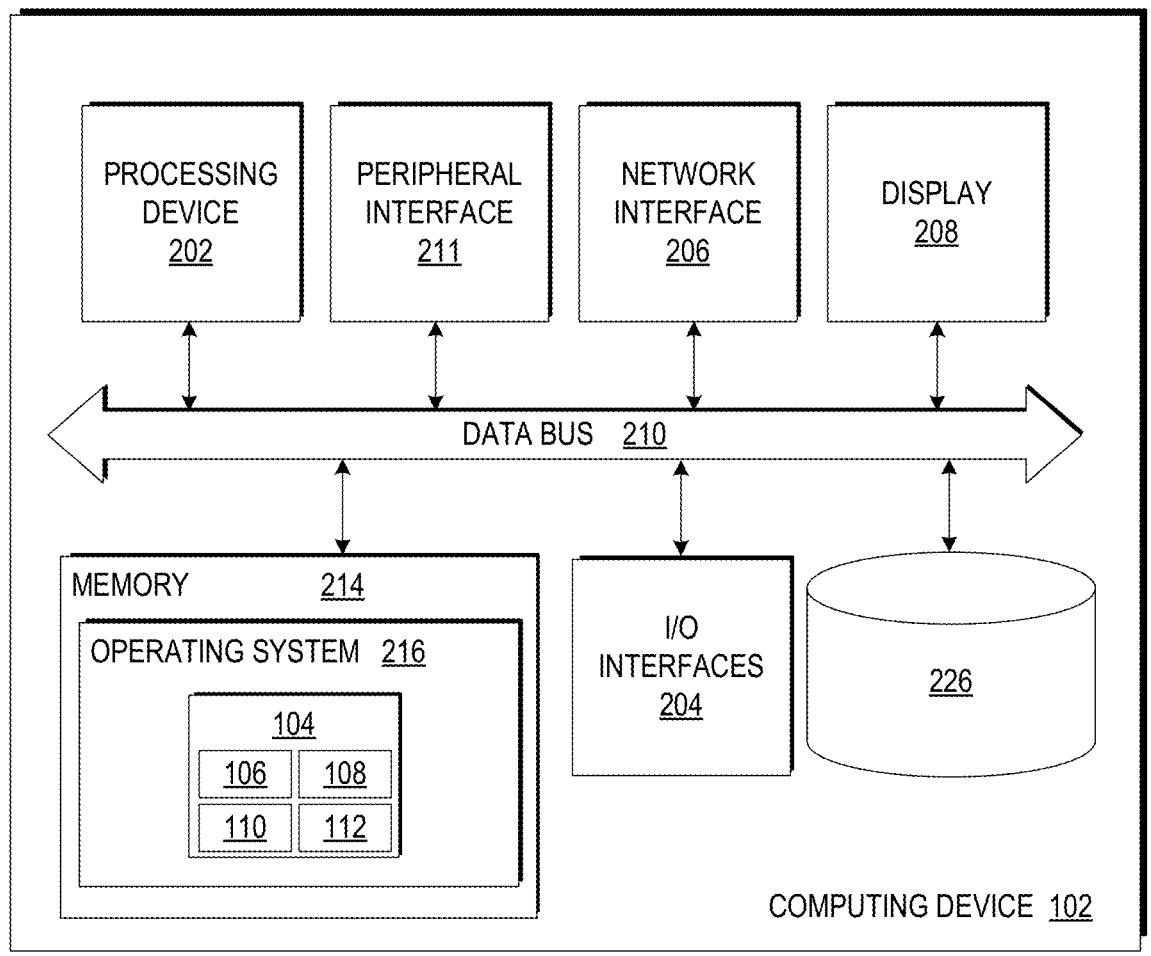
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multi-processor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions for implementing the pin mechanism features disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
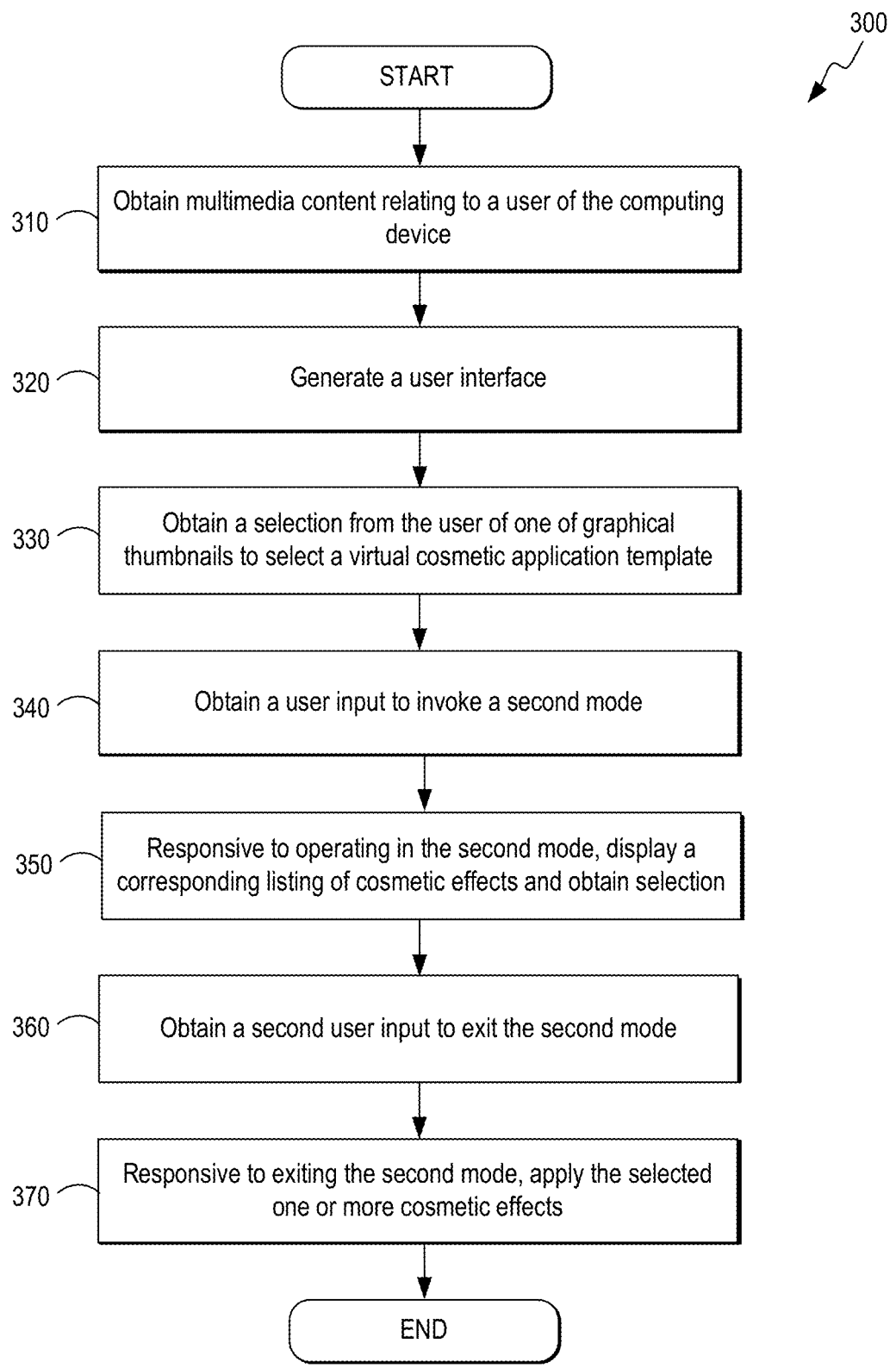
FIG. 3 is a top-level flowchart illustrating examples of functionality implemented as portions of the computing device of FIG. 1 for implementing a pin mechanism in a virtual cosmetic application platform according to various embodiments of the present disclosure.

Reference is made to FIG. 3, which is a flowchart 300 in accordance with various embodiments for implementing a pin mechanism in a virtual cosmetic application platform performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 obtains multimedia content relating to a user of the computing device 102. The multimedia content may comprise a self-portrait image captured by a front facing camera integrated into the computing device 102. Alternatively, the computing device 102 may obtain the multimedia content from an external digital recording device coupled to the computing device 102 or from another computing device with digital recording capabilities.

In block 320, the computing device 102 generates a user interface. In a first mode of operation, the user interface displays a plurality of graphical thumbnails that each depicts a cosmetic result. Each graphical thumbnail corresponds to a cosmetic template, and each of the plurality of cosmetic templates comprises a listing of cosmetic effects utilized for achieving each corresponding cosmetic result. For some embodiments, each of the cosmetic effects in the listing of cosmetic effects for each cosmetic template corresponds to a cosmetic product.

In block 330, the computing device 102 obtains a selection from the user of one of graphical thumbnails to select a cosmetic template. For some embodiments, responsive to obtaining a selection of multiple cosmetic templates in the first mode of operation, the computing device 102 displays a corresponding listing of cosmetic effects for each of the multiple cosmetic templates, wherein the cosmetic effects are grouped according to a cosmetic effect type or according to cosmetic templates. In block 340, the computing device 102 obtains a user input to invoke a second mode. For some embodiments, the user input invoking the second mode comprises setting a toggle control in the user interface to an on state.

In block 350, responsive to operating in the second mode, the computing device 102 displays a corresponding listing of cosmetic effects for the selected cosmetic template and obtains selection of one or more of the displayed cosmetic effects. In some embodiments, a preview window displaying the selected one or more of the displayed cosmetic effects applied to a facial region of the self portrait is also displayed during the second mode of operation. For some embodiments, the corresponding cosmetic effects displayed for the selected cosmetic template while operating in the second mode of operation are all shown in the listing as being selected by default. For such embodiments, the obtained selection of the one or more of the displayed cosmetic effects comprises cosmetic effects to be deselected. For other embodiments, the corresponding cosmetic effects displayed for the selected cosmetic template while operating in the second mode of operation are all shown in the listing as being deselected by default. For such embodiments, the obtained selection of the one or more of the displayed cosmetic effects comprises cosmetic effects to be selected.

For some embodiments, responsive to obtaining a selection of a same displayed cosmetic effect in the second mode of operation for multiple cosmetic templates selected in the first mode of operation, the computing device 102 identifies a cosmetic template corresponding to a most recent selection of the same displayed cosmetic effect, wherein the most recently selected cosmetic effect from the identified cosmetic template is displayed in a preview window displayed in the second mode of operation. For such embodiments, the most recently selected cosmetic effect from the identified cosmetic template is applied to each of the plurality of cosmetic templates to generate updated cosmetic templates.

In block 360, the computing device 102 obtains a second user input to exit the second mode. For some embodiments, the user input for exiting the second mode comprises setting a toggle control in the user interface to an off state. For some embodiments, the multimedia content relating to the user comprises a self-portrait video of the user and/or a self-portrait image of the user. For some embodiments, upon exiting the second mode, the computing device 102 updates each of the cosmetic results depicted on each of the graphical thumbnails based on the selected one or more cosmetic effects to generate updated cosmetic templates. The computing device 102 then stores the updated cosmetic templates to a data store 116 (FIG. 1) in the computing device 102.

In block 370, responsive to exiting the second mode, the computing device 102 applies the selected one or more cosmetic effects from the selected cosmetic template to each of the plurality of cosmetic templates to generate updated cosmetic templates. Thereafter, the process in FIG. 3 ends.

Figure 4:
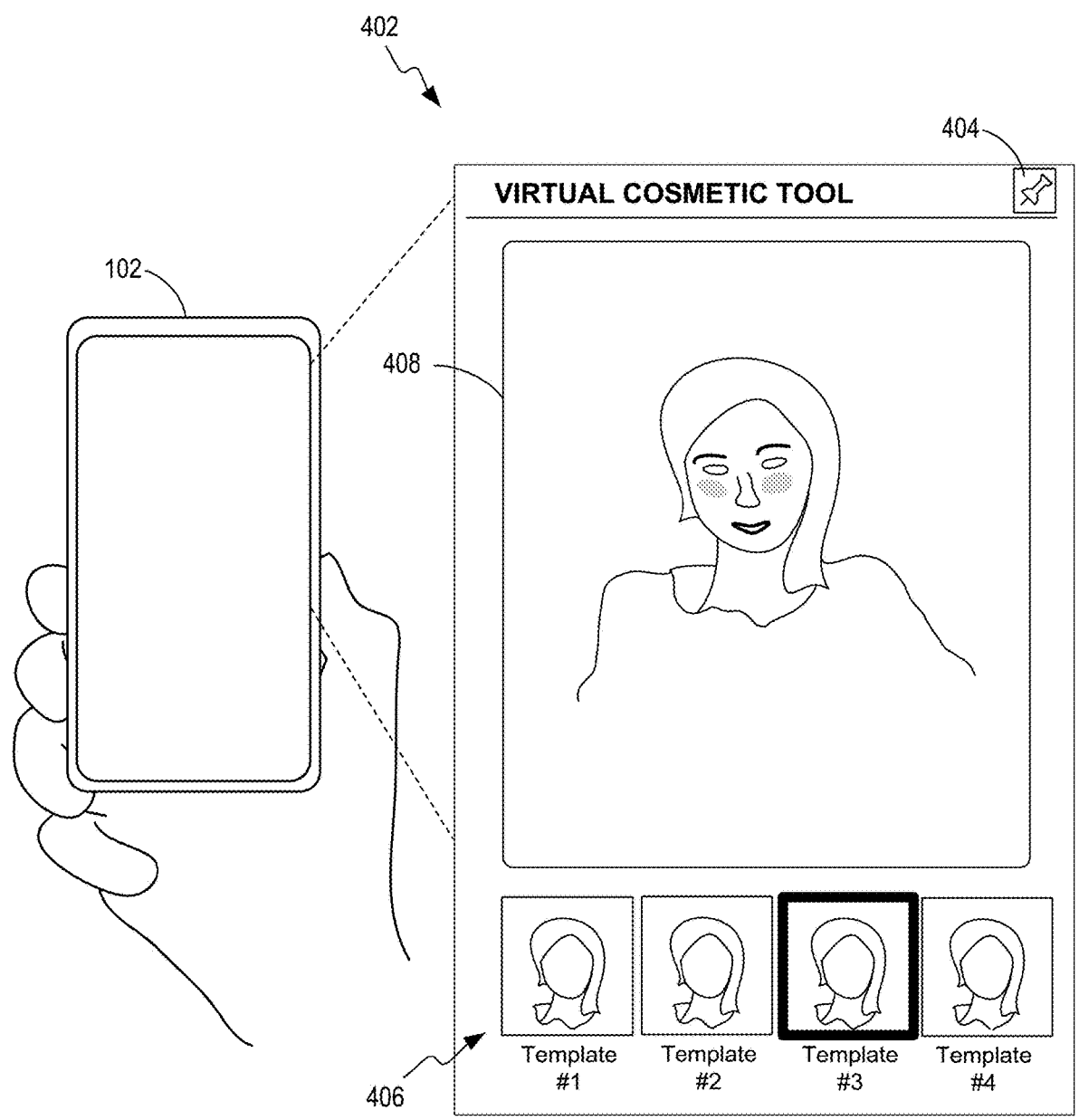
FIG. 4 illustrates an example user interface provided on a display of the computing device in FIG. 1 while operating in a first mode of operation according to various embodiments of the present disclosure.

Having described the basic framework of a system for implementing a pin mechanism in a virtual cosmetic application platform, reference is made to the following figures, which illustrate various features according to various embodiments. FIG. 4 illustrates an example user interface 402 provided on a display of the computing device 102 while operating in a first mode of operation. The computing device 102 may be embodied as a smartphone, a tablet computing device, and so on. As shown, the user interface 402 includes a toggle control 404 which switches between an on state and an off state. Also shown are various graphical thumbnail representations 406, where each graphical thumbnail representation 406 corresponds to a cosmetic template that defines a particular cosmetic result. The user selects a graphical thumbnail representation 406 to select a desired cosmetic result. A preview window 408 in the user interface 402 depicts multimedia content relating to the user with the selected cosmetic result applied to the facial region depicted in the multimedia content relating to the user. The user clicks or presses on the toggle control 404 to transition from the first mode of operation to a second mode of operation.

Figure 5:
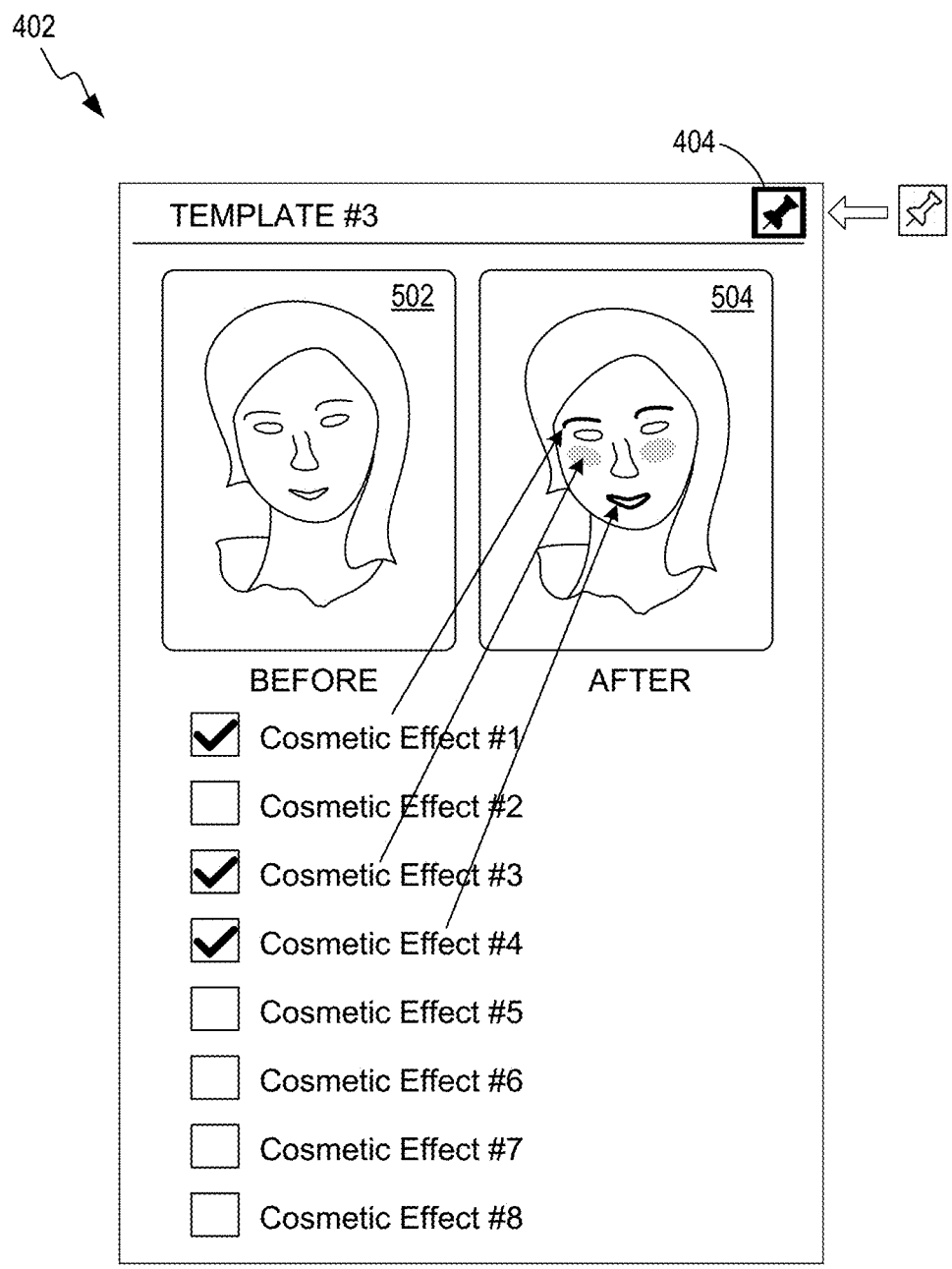
FIG. 5 illustrates an example user interface while operating in a second mode of operation according to various embodiments of the present disclosure.

FIG. 5 illustrates an example user interface 402 while operating in the second mode of operation. In the second mode of operation, a user interface 402 is provided whereby a listing of cosmetic effects utilized to achieve the selected cosmetic result is displayed to the user. In some embodiments, all of the cosmetic effects utilized to achieve the selected cosmetic result are selected by default. The user may then deselect the cosmetic effects that the user wishes to remove from the final cosmetic result. In other embodiments, none of the cosmetic effects are selected by default. The user then selects the desired cosmetic effects. The user interface 402 may include two viewing windows where one of the viewing windows is a preview window ("after" window) that shows the select cosmetic effects applied to the facial region depicted in the multimedia content relating to the user. The other viewing window ("before" window) may show the facial region depicted in the multimedia content relating to the user without any cosmetic effects.

Figure 6:
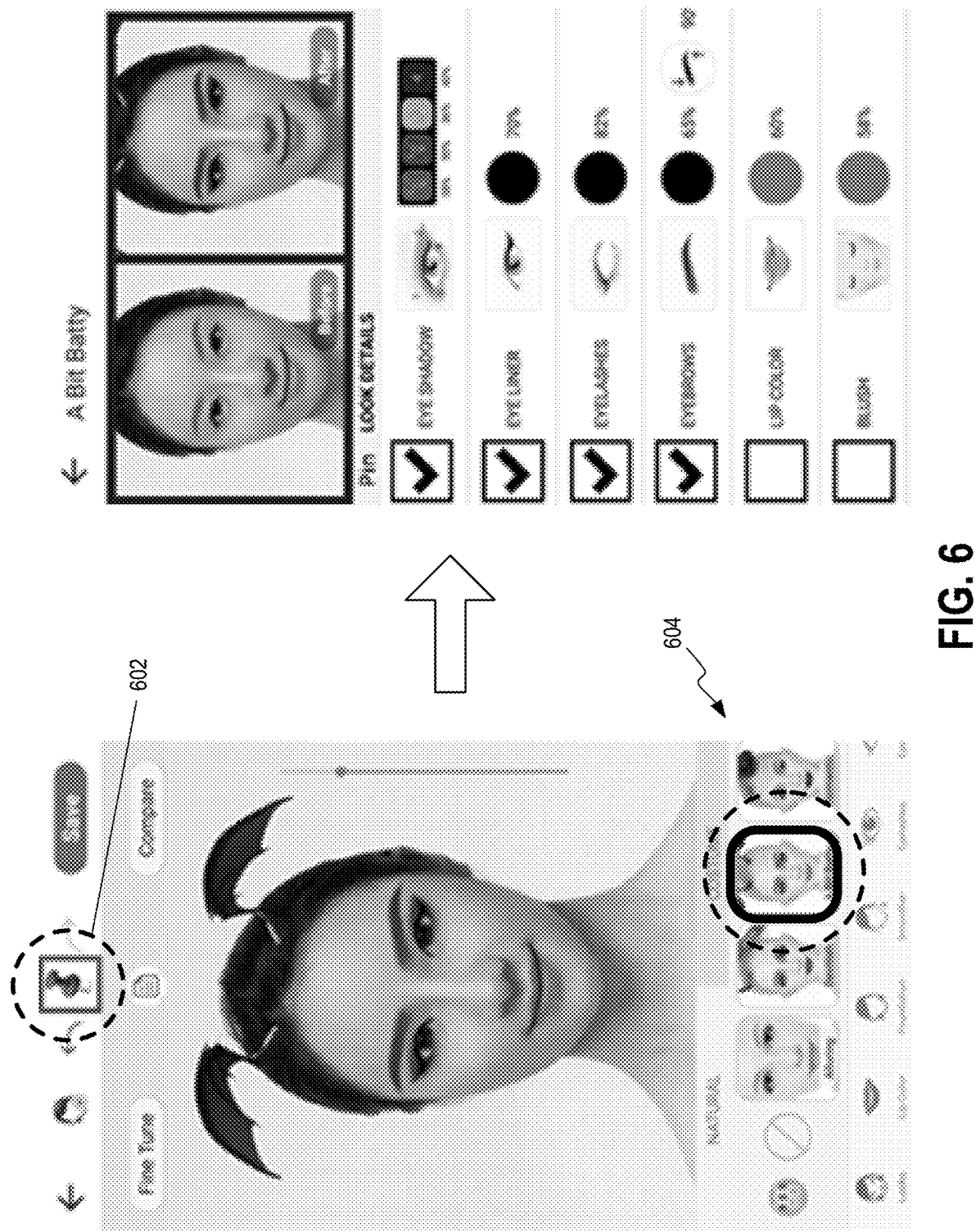
FIG. 6 illustrates examples user interfaces described in connection with FIGS. 4 and 5 according to various embodiments of the present disclosure.

FIG. 6 illustrates examples user interfaces described in connection with FIGS. 4 and 5. As shown, a desired cosmetic result is selected by clicking or highlighting one of the graphical thumbnail representations 604. The selected cosmetic result is then applied to the facial region depicted in the multimedia content relating to the user. The user may then invoke a second mode of operation by clicking or selecting the pin tool 602 at the top. In the second mode of operation, the user then selects the desired cosmetic effects from the listing of cosmetic effects utilized to achieve the select cosmetic result. In the example shown, the user elects to not include the lip color and blush effects. The selected cosmetic effects (i.e., eye shadow cosmetic effect, eye liner cosmetic effect, eyelashes cosmetic effect, eyebrow cosmetic effect) are applied to the facial region depicted in the multimedia content relating to the user as shown in the "after" preview window on the right.

Figure 7:
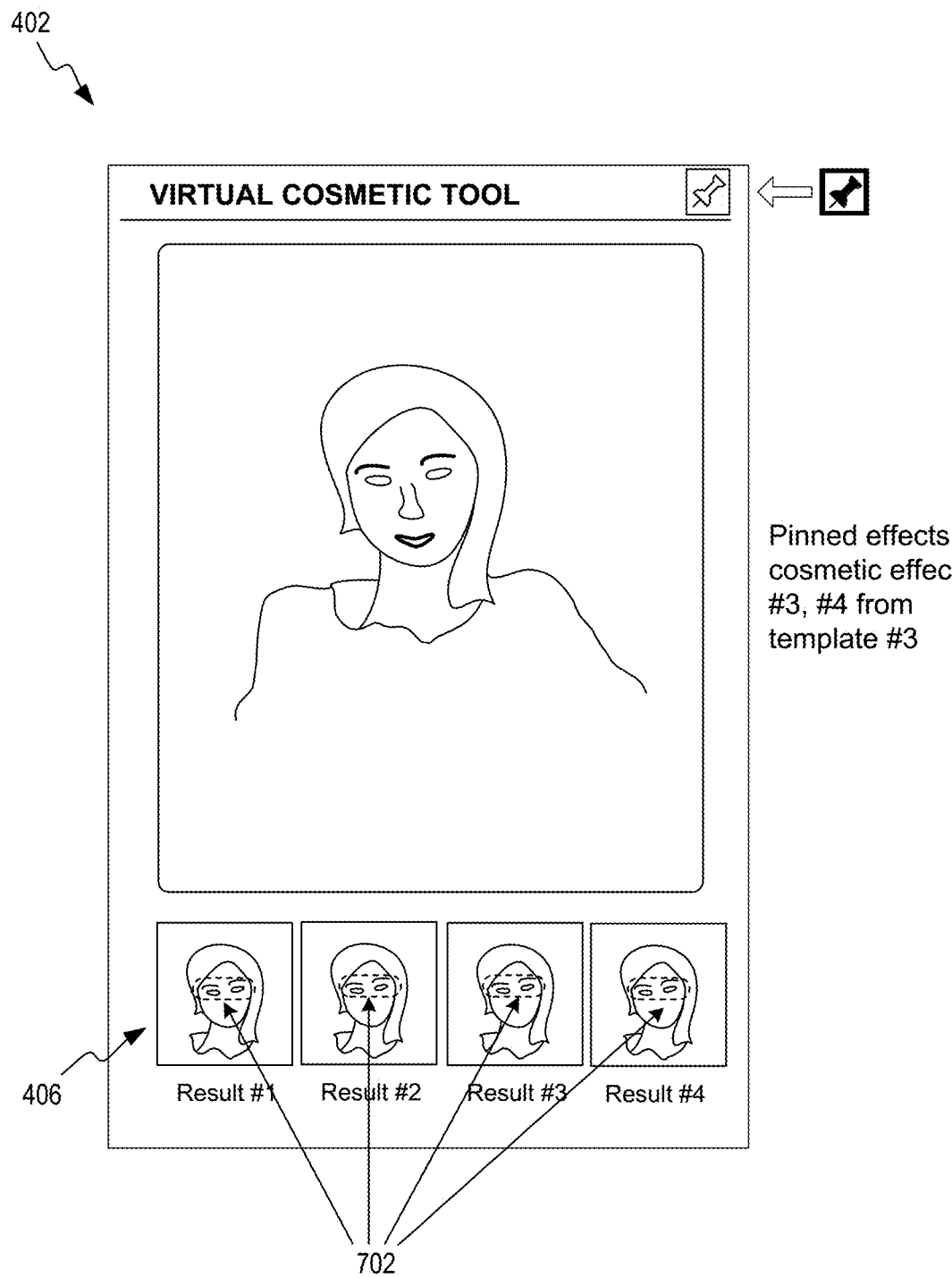
FIG. 7 illustrates how the selected cosmetic effects are propagated to the cosmetic templates according to various embodiments of the present disclosure.

FIG. 7 illustrates how the selected cosmetic effects are propagated to the cosmetic templates. Referring back briefly to FIG. 5, once the user has selected the desired cosmetic effects, the user may then click or press the toggle control 404 to exit the second operating mode. Alternatively, another user interface control (e.g., a "save" button) may be provided in the user interface 402 to allow the user to exit the second operating mode. Referring now to FIG. 7, the selected or "pinned" cosmetic effects are automatically applied to the cosmetic templates. Furthermore, the graphical thumbnail representations 406 are updated accordingly to depict the selected cosmetic effect(s). In the example shown, assume that the user selected cosmetic effect #3 (e.g., eyelash cosmetic effect) and cosmetic effect #4 (e.g., eyebrow cosmetic effect) from cosmetic template #4.

These cosmetic effects 702 are then automatically propagated to all the cosmetic templates to generate updated cosmetic templates. The updated cosmetic templates are then stored. As shown, the corresponding graphical thumbnail representations 406 are also updated accordingly. Furthermore, the graphical thumbnail representations 406 are updated accordingly to depict the selected cosmetic effect. In the example shown, assume that the user selected cosmetic effect #3 (e.g., lip cosmetic effect from CHANEL number 416 teasing pink). These cosmetic effects 702 are then automatically propagated to all the cosmetic templates including lip cosmetic effect (e.g., CHANEL number 416 teasing pink) to generate updated cosmetic templates.

Figure 8:
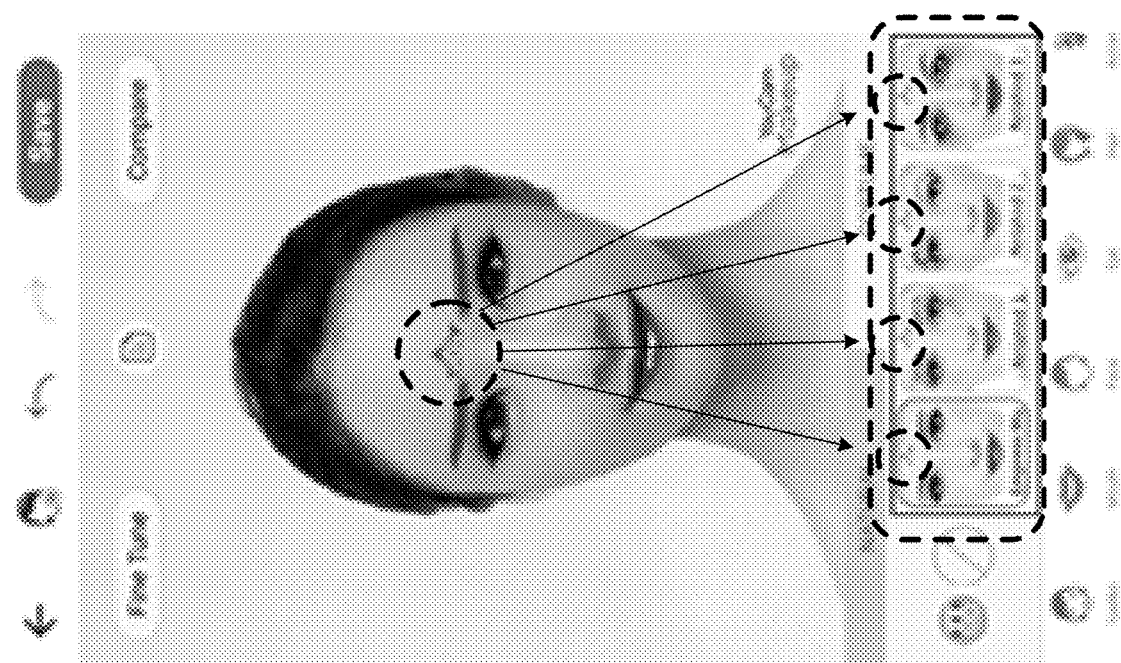
FIG. 8 illustrates examples user interfaces described in connection with FIGS. 5 and 7 according to various embodiments of the present disclosure.
Figure 8:
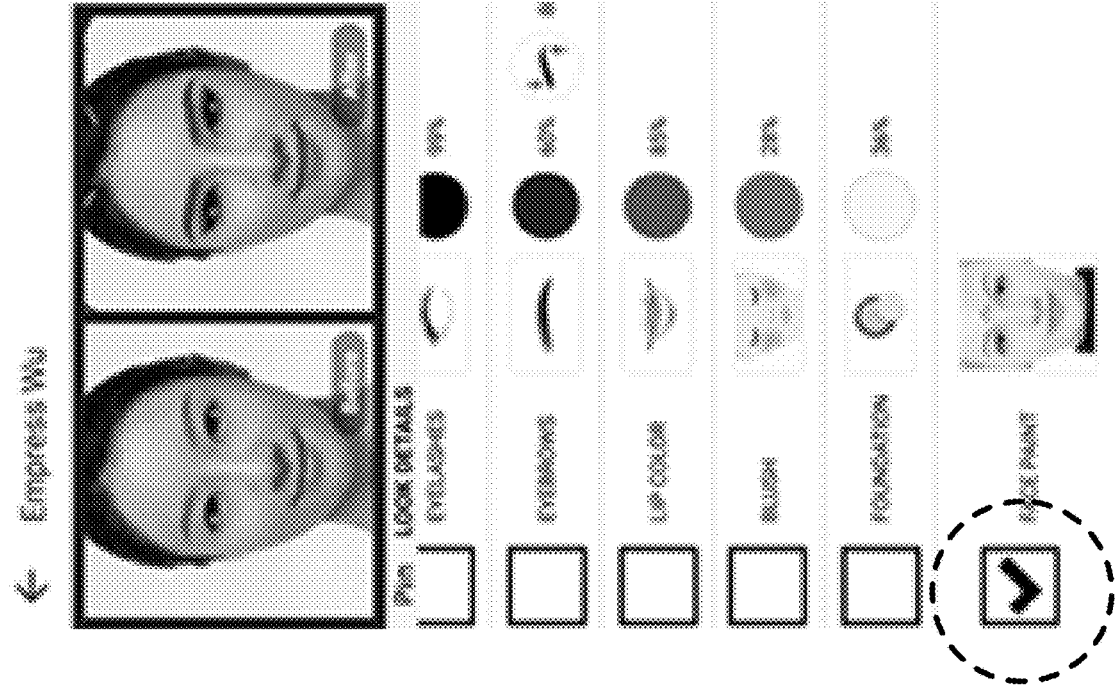

FIG. 8 illustrates examples user interfaces described in connection with FIGS. 5 and 7. As shown, the user selects a cosmetic effect (i.e., face paint effect) while the user interface is in a second mode of operation. The user exits the second mode of operation by either clicking or pressing on a toggle control or by pressing a "save" button. This causes the selected cosmetic effect to be automatically propagated to all the cosmetic templates. Furthermore, as shown, all the graphical thumbnail representations are updated accordingly.

Figure 9:
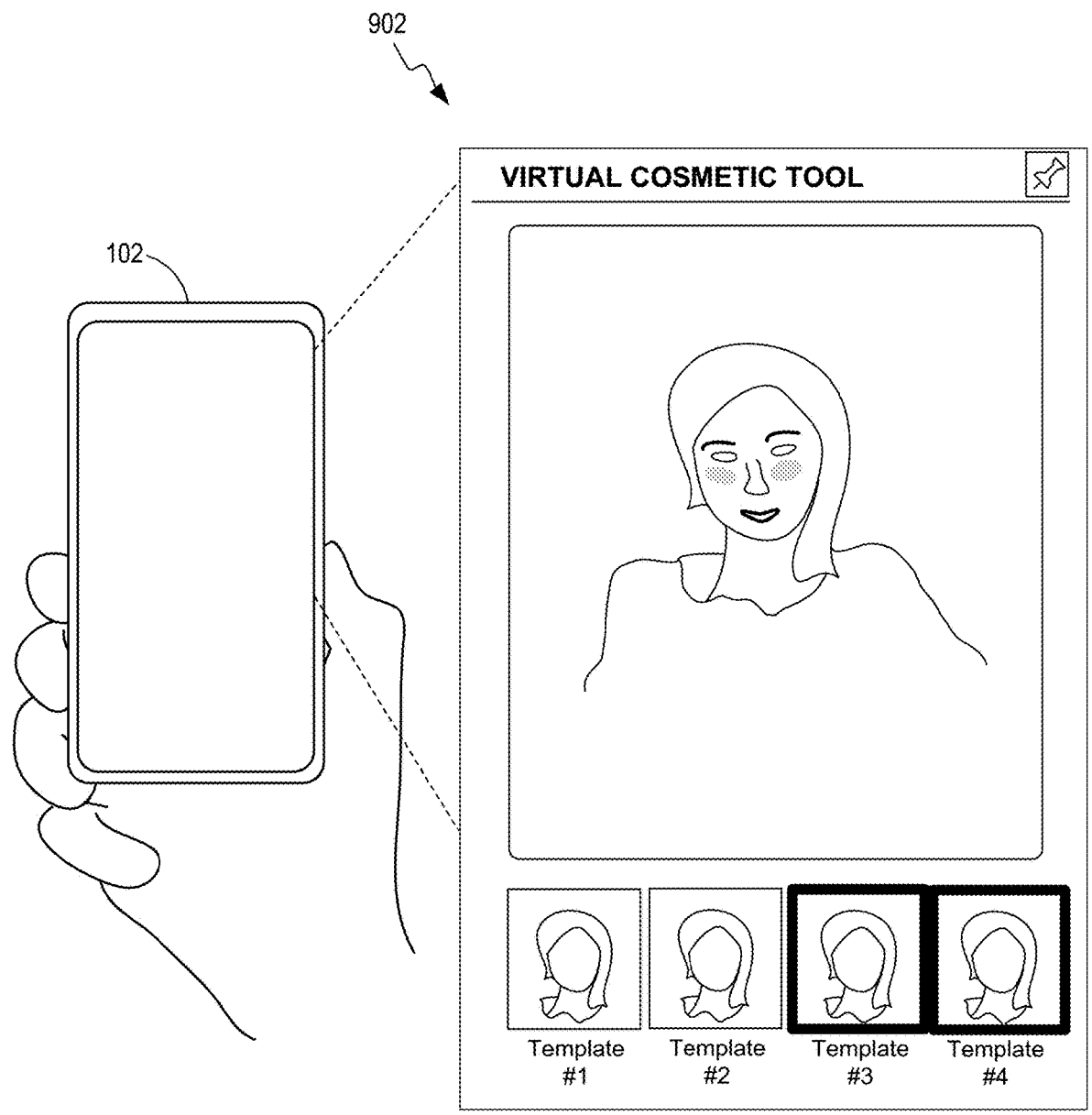
FIG. 9 illustrates another example user interface provided on a display of the computing device in FIG. 1 while operating in a first mode of operation involving multiple selected cosmetic templates according to various embodiments of the present disclosure.

FIG. 9 illustrates another example user interface 902 provided on a display of the computing device in FIG. 1 while operating in a first mode of operation involving multiple selected cosmetic templates according to various embodiments of the present disclosure. In accordance with some embodiments, the user is not limited to selecting a single cosmetic template and can select multiple cosmetic templates. In the example shown, the user selects two of the graphical thumbnail representations, where each graphical thumbnail representation corresponds to a cosmetic template that defines a particular cosmetic result.

Figure 10:
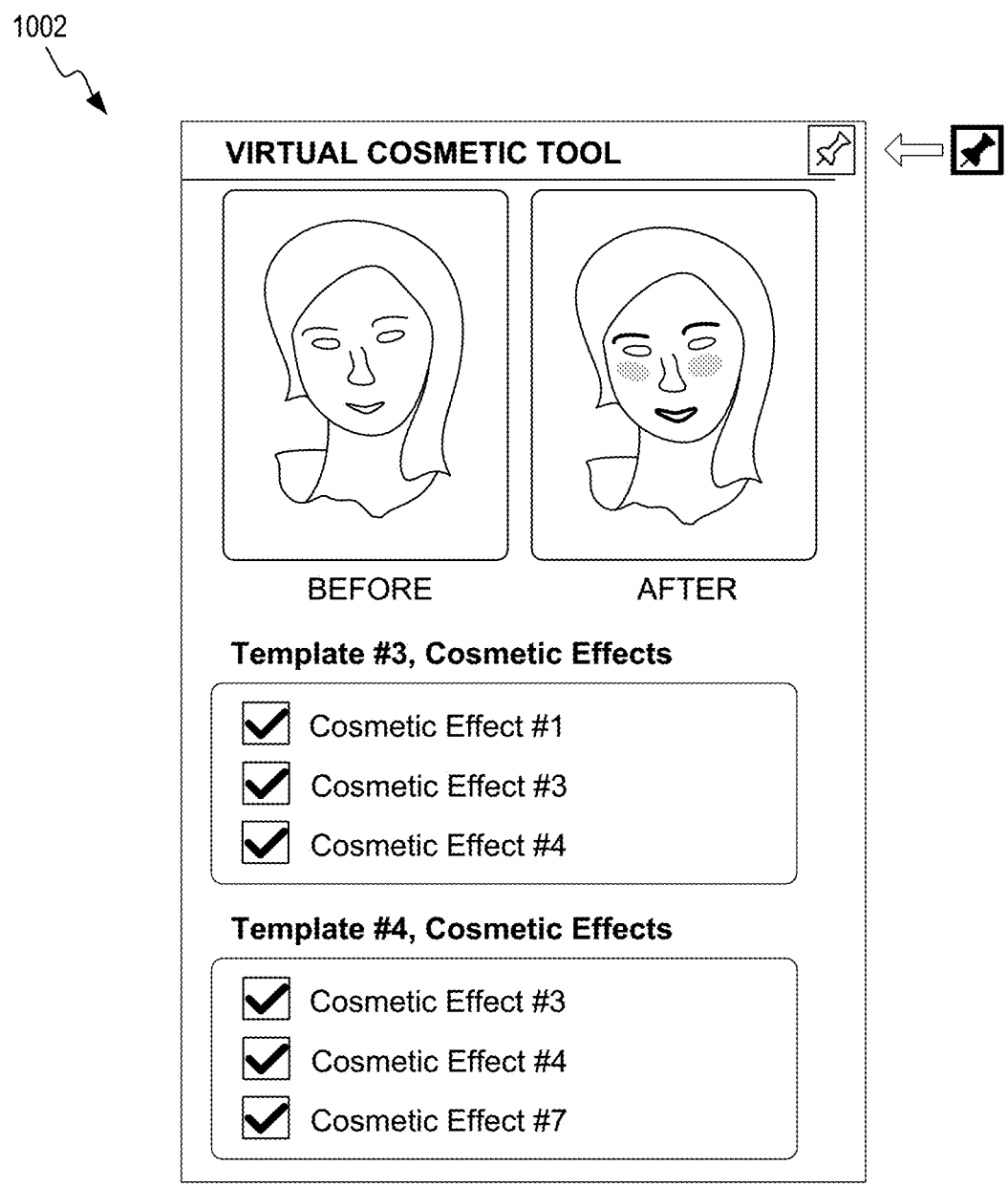
FIG. 10 illustrates an example of a first type of user interface while operating in a second mode of operation involving multiple selected cosmetic templates according to various embodiments of the present disclosure.

FIG. 10 illustrates an example of a first type of user interface 1002 while operating in the second mode of operation involving multiple selected cosmetic templates. In the second mode of operation, a user interface 1002 is provided whereby a listing of cosmetic effects for each of the selected cosmetic templates in FIG. 10 is utilized to achieve the selected cosmetic result is displayed to the user. In some embodiments, all of the cosmetic effects utilized to achieve the selected cosmetic result are selected by default. The user may then deselect the cosmetic effects that the user wishes to remove from the final cosmetic result. In other embodiments, none of the cosmetic effects are selected by default. The user then selects the desired cosmetic effects. In the example user interface 1002 shown, the cosmetic effects are grouped according to the cosmetic templates selected by the user. In accordance with some embodiments, if the user selects the same cosmetic effect (e.g., Cosmetic Effect #2) for multiple cosmetic templates (e.g., Template #3 and Template #4), the computing device 102 will only select the version of the cosmetic effect (Cosmetic Effect #2) that was most recently selected. For such embodiments, the preview window displays the latest selection from the user.

Figure 11:
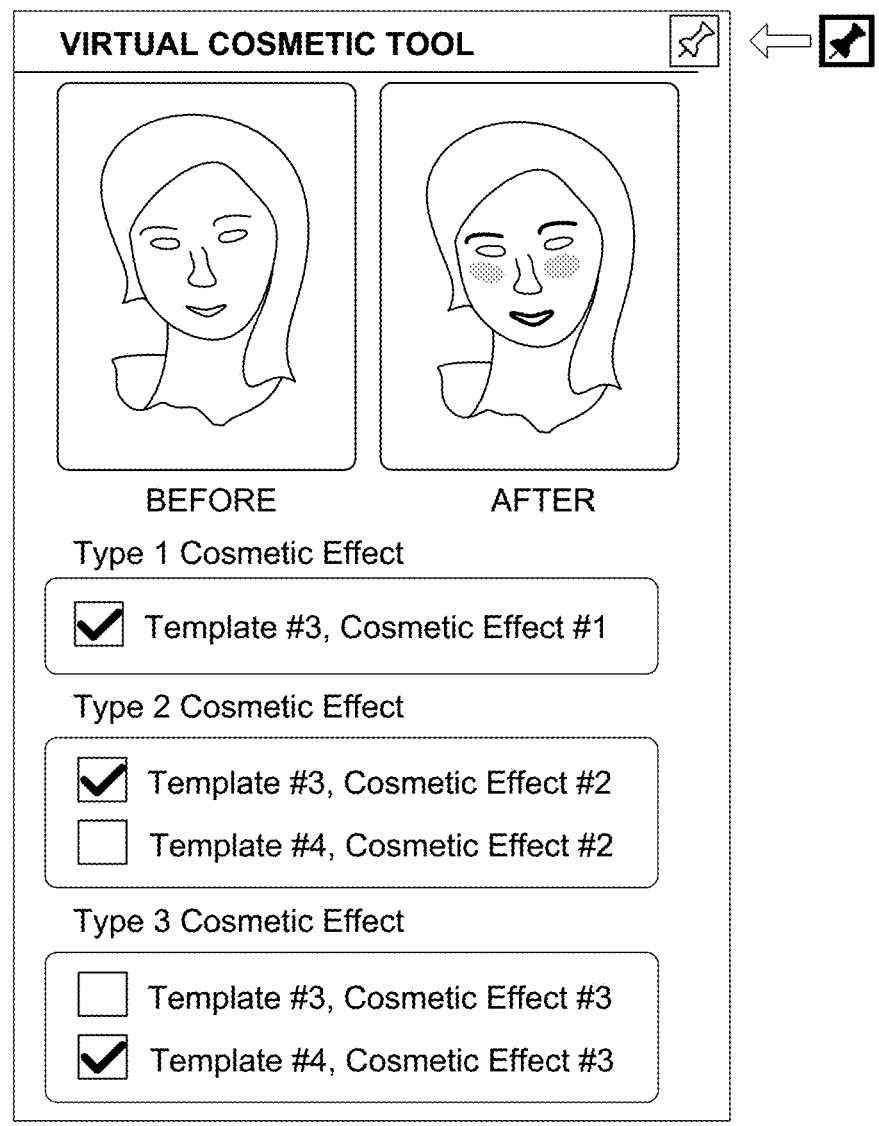
FIG. 11 illustrates an example of a second type of user interface while operating in a second mode of operation involving multiple selected cosmetic templates according to various embodiments of the present disclosure.

FIG. 11 illustrates an example of a second type of user interface 1102 while operating in the second mode of operation involving multiple selected cosmetic templates. In the second mode of operation, a user interface 1102 is provided whereby a listing of cosmetic effects for each of the selected cosmetic templates in FIG. 11 utilized to achieve the selected cosmetic result is displayed to the user. In the second type of user interface 1102 shown, selected cosmetic effects are grouped according to types of cosmetic effects (e.g., eye shadow effect type, eye liner effect type, lip color effect type). Again, if the user selects the same cosmetic effect (e.g., Cosmetic Effect #2) for multiple cosmetic templates (e.g., Template #3 and Template #4), the computing device 102 will only select the version of the cosmetic effect (Cosmetic Effect #2) that was most recently selected. For such embodiments, the preview window displays the latest selection from the user.

Figure 12:
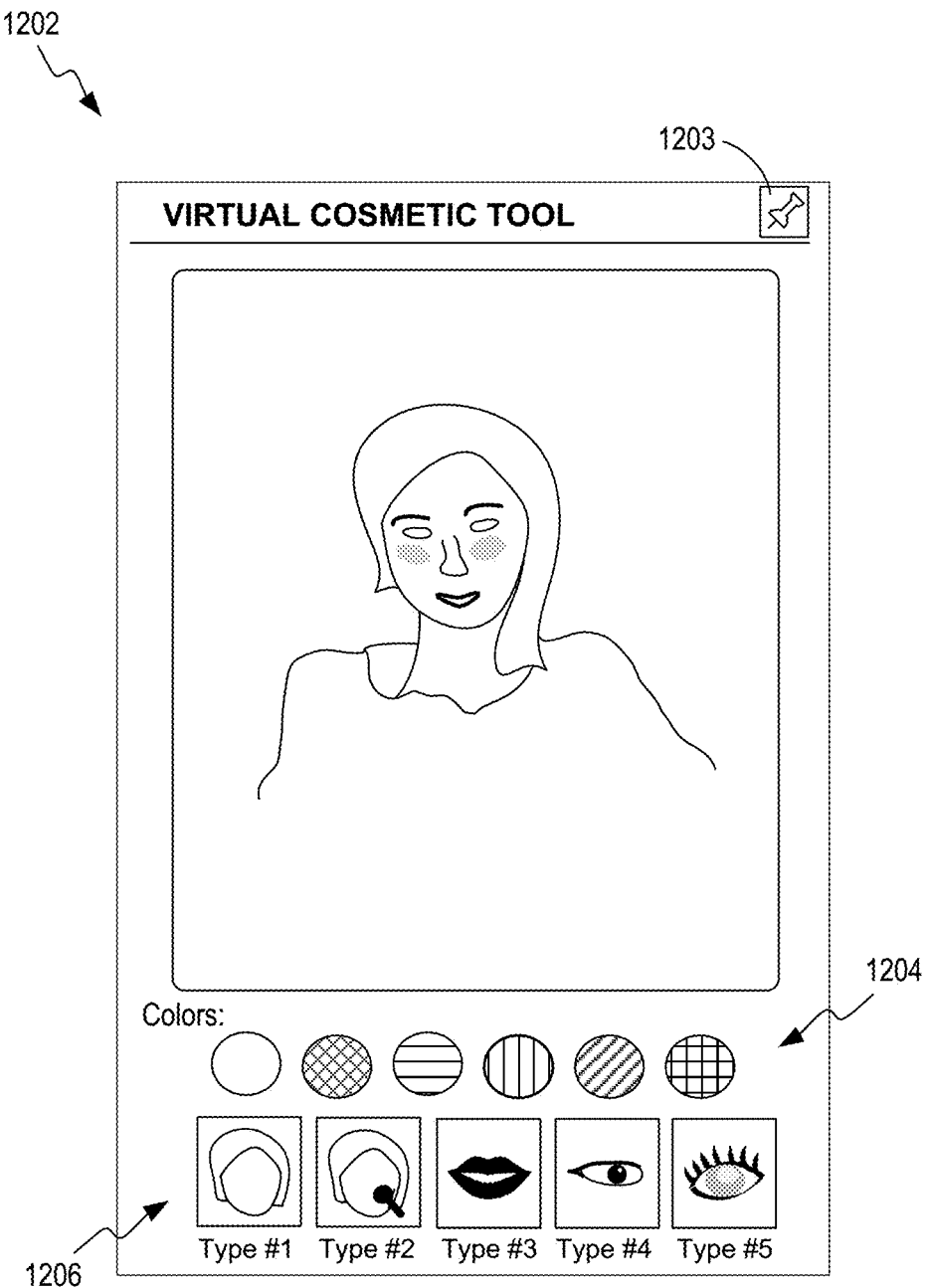
FIG. 12 illustrates another example user interface provided on a display of the computing device in FIG. 1 while operating in a first mode of operation according to various embodiments of the present disclosure.

FIG. 12 illustrates another example user interface 1202 provided on a display of the computing device 102 in FIG. 1 while operating in a first mode of operation according to various embodiments of the present disclosure. As shown, the user interface 1202 includes various types of cosmetic effects 1206. The user interface 1202 also includes selectable attributes 1204 for the different types of cosmetic effects 1206. In the example shown, the attributes 1204 comprise different colors. The user interface 1202 also includes a toggle control 1203 which switches between an on state and an off state.

Figure 13:
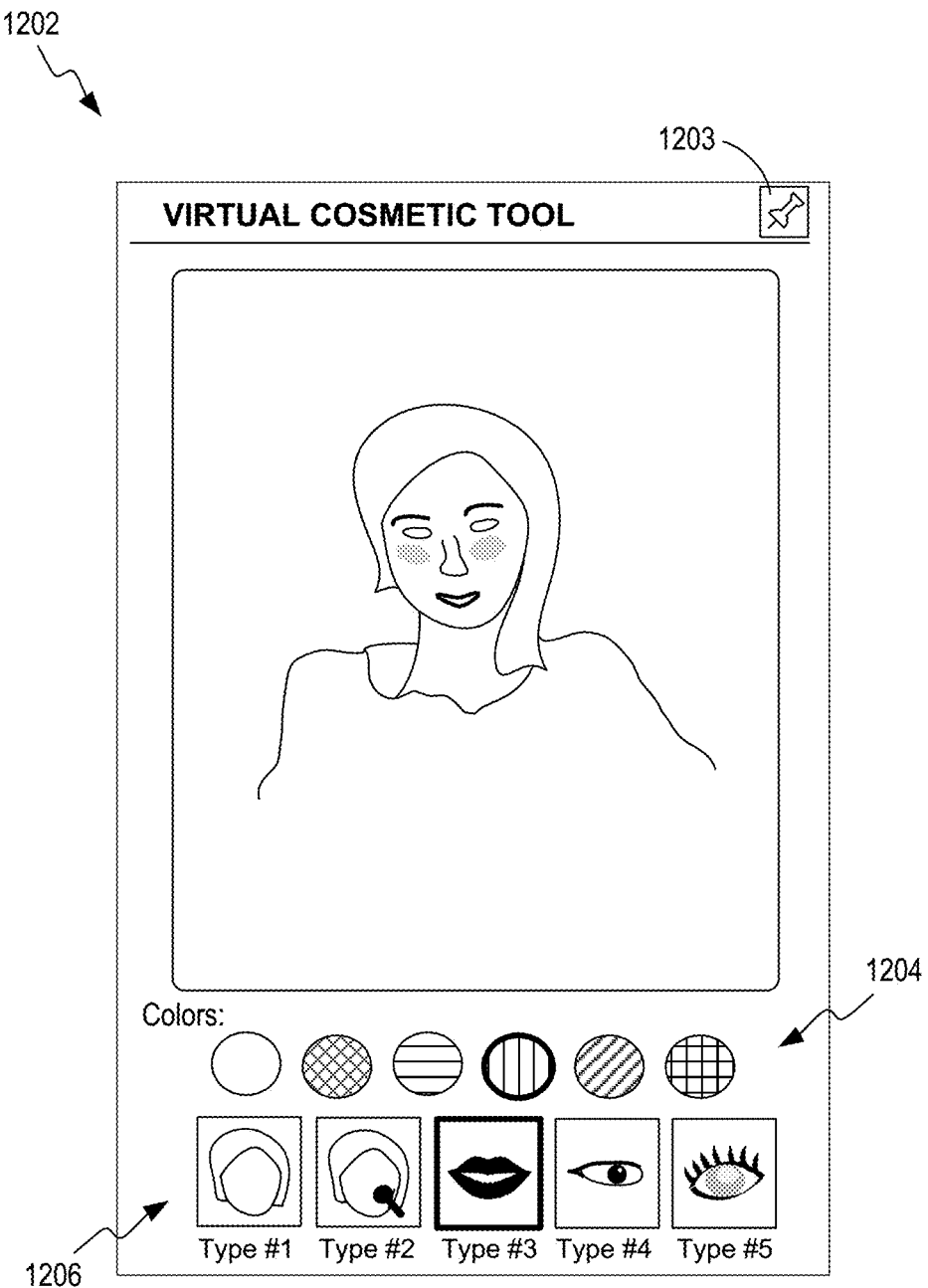
FIG. 13 illustrates selection of a cosmetic type and corresponding attribute in the user interface of FIG. 12 according to various embodiments of the present disclosure.

FIG. 13 illustrates selection of a cosmetic type and corresponding attribute in the user interface 1202 of FIG. 12 according to various embodiments of the present disclosure. In the example shown, the user selects a cosmetic effect type 1206 (lipstick) and a corresponding color. The user can repeat the selection process multiple times. For example, during a second iteration, the user may select another cosmetic effect type 1206 (e.g., eye liner) along with a corresponding color. Once the user finishes with selecting all the desired cosmetic effect types 1206, the user invokes a second mode of operation using the toggle control 1203. When the user exits the second mode of operation, the selected cosmetic effects and corresponding attributes are automatically propagated to all the cosmetic templates.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device, comprising:
   obtaining multimedia content relating to a user of the computing device;
   generating a user interface, wherein in a first mode of operation, the user interface displays a plurality of graphical thumbnails each depicting a cosmetic result, each graphical thumbnail corresponding to a cosmetic template, each of the plurality of cosmetic templates comprising a listing of cosmetic effects utilized for achieving each corresponding cosmetic result;
   obtaining a selection from the user of a plurality of graphical thumbnails to select a plurality of cosmetic templates;
   obtaining a user input to invoke a second mode of operation;
   responsive to operating in the second mode of operation, performing the steps of:
       displaying a corresponding listing of cosmetic effects for each of the plurality of selected cosmetic templates, wherein the cosmetic effects corresponding to the plurality of selected cosmetic templates are grouped according to types of cosmetic effects; and
       obtaining selection of one or more of the displayed cosmetic effects from the cosmetic effects grouped according to types of cosmetic effects, wherein the corresponding cosmetic effects displayed for the selected cosmetic templates while operating in the second mode of operation are all shown in the listing as being selected by default, and wherein the obtained selection of the one or more of the displayed cosmetic effects comprises cosmetic effects to be deselected;

obtaining a second user input to exit the second mode of operation;

responsive to exiting the second mode of operation, applying the selected one or more cosmetic effects from the one or more selected cosmetic templates to generate an updated cosmetic template; and updating the user interface to display the updated cosmetic template.

2. The method of claim 1, wherein the multimedia content relating to the user comprises at least one of: a self-portrait video of the user; and a self-portrait image of the user.

3. The method of claim 1, further comprising:

responsive to obtaining a selection of a same displayed cosmetic effect in the second mode of operation for multiple cosmetic templates selected in the first mode of operation, identifying a cosmetic template corresponding to a most recent selection of the same displayed cosmetic effect, wherein the most recently selected cosmetic effect from the identified cosmetic template is displayed in a preview window displayed in the second mode of operation, and wherein the most recently selected cosmetic effect from the identified cosmetic template is applied to each of the plurality of cosmetic templates to generate updated cosmetic templates.

4. The method of claim 1, wherein the user input invoking the second mode of operation comprises setting a toggle control in the user interface to an on state.

5. The method of claim 4, wherein the second user input for exiting the second mode of operation comprises setting the toggle control in the user interface to an off state.

6. The method of claim 1, further comprising:

responsive to operating in the second mode of operation, displaying a preview window displaying the selected one or more of the displayed cosmetic effects applied to a facial region depicted in the multimedia content relating to the user.

7. The method of claim 1, further comprising storing the updated cosmetic templates to a data store of the computing device.

8. The method of claim 1, wherein each of the cosmetic effects in the listing of cosmetic effects for each cosmetic templates corresponds to a cosmetic product.

9. A system, comprising:

a display;

a memory storing instructions;

a processor coupled to the memory and configured by the instructions to at least:

obtain multimedia content relating to a user of the system;

generate a user interface, wherein in a first mode of operation, the user interface displays a plurality of graphical thumbnails each depicting a cosmetic result, each graphical thumbnail corresponding to a cosmetic template, each of the plurality of cosmetic templates comprising a listing of cosmetic effects utilized for achieving each corresponding cosmetic result;

obtain a selection from the user of a plurality of graphical thumbnails to select a plurality of cosmetic templates;

obtain a user input to invoke a second mode of operation;

responsive to operating in the second mode of operation, the processor is further configured to:

display a corresponding listing of cosmetic effects for each of the plurality of selected cosmetic templates, wherein the cosmetic effects corresponding to the plurality of selected cosmetic templates are grouped according to types of cosmetic effects; and obtain selection of one or more of the displayed cosmetic effects from the cosmetic effects grouped according to types of cosmetic effects, wherein the corresponding cosmetic effects displayed for the selected cosmetic templates while operating in the second mode of operation are all shown in the listing as being selected by default, and wherein the obtained selection of the one or more of the displayed cosmetic effects comprises cosmetic effects to be deselected;

obtain a second user input to exit the second mode of operation;

responsive to exiting the second mode of operation, apply the selected one or more cosmetic effects from the one or more selected cosmetic templates to generate an updated cosmetic template; and update the user interface to display the updated cosmetic template.

10. The system of claim 9, wherein the user input invoking the second mode of operation comprises setting a toggle control in the user interface to an on state.

11. The system of claim 10, wherein the second user input for exiting the second mode of operation comprises setting the toggle control in the user interface to an off state.

12. The system of claim 9, wherein responsive to operating in the second mode of operation, the processor is further configured to display a preview window displaying the selected one or more of the displayed cosmetic effects applied to a facial region depicted in the multimedia content relating to the user.

13. The system of claim 9, wherein the processor is further configured to store the updated cosmetic templates to a data store of the system.

14. The system of claim 9, wherein each of the cosmetic effects in the listing of cosmetic effects for each cosmetic templates corresponds to a cosmetic product.

15. A non-transitory computer-readable storage medium storing instructions to be implemented by a computing device having a processor, wherein the instructions, when executed by the processor, cause the computing device to at least:

obtain multimedia content relating to a user of the computing device;

generate a user interface, wherein in a first mode of operation, the user interface displays a plurality of graphical thumbnails each depicting a cosmetic result, each graphical thumbnail corresponding to a cosmetic template, each of the plurality of cosmetic templates comprising a listing of cosmetic effects utilized for achieving each corresponding cosmetic result;

obtain a selection from the user of a plurality of graphical thumbnails to select a plurality of cosmetic templates;

obtain a user input to invoke a second mode of operation;

responsive to operating in the second mode of operation, the computing device is further configured to:

display a corresponding listing of cosmetic effects for each of the plurality of selected cosmetic templates, wherein the cosmetic effects corresponding to the plurality of selected cosmetic templates are grouped according to types of cosmetic effects; and obtain selection of one or more of the displayed cosmetic effects from the cosmetic effects grouped according to types of cosmetic effects, wherein the corresponding cosmetic effects displayed for the selected cosmetic templates while operating in the second mode of operation are all shown in the listing as being selected by default, and wherein the obtained selection of the one or more of the displayed cosmetic effects comprises cosmetic effects to be deselected;

responsive to exiting the second mode of operation, apply the selected one or more cosmetic effects from the one or more selected cosmetic templates to generate an updated cosmetic template; and update the user interface to display the updated cosmetic template.

16. The non-transitory computer-readable storage medium of claim 15, wherein the user input invoking the second mode of operation comprises setting a toggle control in the user interface to an on state.

17. The non-transitory computer-readable storage medium of claim 16, wherein the second user input for exiting the second mode of operation comprises setting the toggle control in the user interface to an off state.

18. The non-transitory computer-readable storage medium of claim 15, wherein the processor is further configured to store the updated cosmetic templates to a data store of the computing device.

19. The non-transitory computer-readable storage medium of claim 15, wherein each of the cosmetic effects in the listing of cosmetic effects for each cosmetic templates corresponds to a cosmetic product.

* * * * *